(12) United States Patent
Wiinter et al.

(10) Patent No.: US 6,993,249 B1
(45) Date of Patent: Jan. 31, 2006

(54) CODING METHOD FOR PICTURE SEQUENCE OR SUB-PICTURE UNIT

(75) Inventors: Marco Wiinter, Hannover (DE); Harald Schiller, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 978 days.

(21) Appl. No.: 09/691,806

(22) Filed: Oct. 19, 2000

(30) Foreign Application Priority Data

Oct. 20, 1999 (DE) ................................. 199 50 490

(51) Int. Cl.
*H04N 5/91* (2006.01)
(52) U.S. Cl. .......................................... 386/95; 386/126
(58) Field of Classification Search ................. 386/46, 386/95, 96, 98, 111, 112, 125, 126, 45
See application file for complete search history.

(56) References Cited

U.S. PATENT DOCUMENTS 5,758,007 A * 5/1998 Kitamura et al. ............. 386/45
6,115,529 A * 9/2000 Park ............................... 386/1

FOREIGN PATENT DOCUMENTS

| DE | 4008114 C2 | 5/1991 |
| DE | 19752507 A1 | 6/1999 |
| DE | 19757046 A1 | 6/1999 |
| EP | 0725541 A2 | 8/1996 |
| EP | 09123822 A2 | 5/1999 |

* cited by examiner

*Primary Examiner*—Huy Nguyen
(74) *Attorney, Agent, or Firm*—Joseph S. Tripoli; Francis A. Davenport; Jorge T. Villabon

(57) ABSTRACT

The DVD Standard specifies how, for example, subtitles can be overlaid on a video picture in a simple way. According to this Standard, in each case one so-called sub-picture data unit must be provided on a DVD disk per overlay. The DVD Standard does not contain any information as to how horizontally moving objects can also be displayed in a display window using such sub-picture data units, for example to provide a running script. The aim of the invention is to make it possible to produce horizontally moving objects such as running scripts, using the rules and instructions specified in the DVD Standard, while optimizing the memory requirement. The invention achieves the object by using a specific type of run-length coding in conjunction with a special way of combining object picture segments. The invention relates to a corresponding method for coding a picture sequence, and a corresponding sub-picture data unit as well as a data storage medium.

17 Claims, 5 Drawing Sheets

```
0167 : ################### SP_DCSQ 4 = 0x4
0167 : 01 5F              # SP_DCSQ_STM => start frame: 120
0169 : 01 82              # SP_NXT_DCSQ_SA = 386 = 0x182
016B : 07 00 10           # CHG_COLON (Extended field size = 16 = 0x10)
016E : 00 02 10 C8        #   LN_CTLI 0:  n=1 csln=2 ctln=200
0172 : 00 6E 10 10 FF FF  #     PX_CTLI 0: cspn=110 col= 0 1 0 1 cntr=F F F F
0178 : 0F FF FF FF        #   LN_CTLI Termination Code
017C : 06 00 08 00 37     # SET_DSPXA uf=0x8 bf=0x37
0181 : FF                 # CMD_END
0182 : ################### SP_DCSQ 5 = 0x5
0182 : 01 B7              # SP_DCSQ_STM => start frame: 150
0184 : 01 9D              # SP_NXT_DCSQ_SA = 413 = 0x19D
0186 : 07 00 10           # CHG_COLON (Extended field size = 16 = 0x10)
0189 : 00 02 10 C8        #   LN_CTLI 0: n=1 csln=2 ctln=200
018D : 00 6C 10 10 FF FF  #     PX_CTLI 0: cspn=108 col= 0 1 0 1 cntr=F F F F
0193 : 0F FF FF FF        #   LN_CTLI Termination Code
0197 : 06 00 09 00 38     # SET_DSPXA uf=0x9 bf=0x38
019C : FF                 # CMD_END
019D : ################### SP_DCSQ 6 = 0x6
019D : 02 0F              # SP_DCSQ_STM => start frame: 180
019F : 01 B8              # SP_NXT_DCSQ_SA = 440 = 0x1B8
01A1 : 07 00 10           # CHG_COLON (Extended field size = 16 = 0x10)
01A4 : 00 02 10 C8        #   LN_CTLI 0: n=1 csln=2 ctln=200
01A8 : 00 6A 10 10 FF FF  #     PX_CTLI 0: cspn=106 col= 0 1 0 1 cntr=F F F F
01AE : 0F FF FF FF        #   LN_CTLI Termination Code
01B2 : 06 00 0A 00 39     # SET_DSPXA uf=0xA bf=0x39
01B7 : FF                 # CMD_END
01B8 : ################### SP_DCSQ 7 = 0x7
01B8 : 02 67              # SP_DCSQ_STM => start frame: 210
01BA : 01 D3              # SP_NXT_DCSQ_SA = 467 = 0x1D3
01BC : 07 00 10           # CHG_COLON (Extended field size = 16 = 0x10)
01BF : 00 02 10 C8        #   LN_CTLI 0: n=1 csln=2 ctln=200
01C3 : 00 68 10 10 FF FF  #     PX_CTLI 0: cspn=104 col= 0 1 0 1 cntr=F F F F
01C9 : 0F FF FF FF        #   LN_CTLI Termination Code
01CD : 06 00 0B 00 3A     # SET_DSPXA uf=0xB bf=0x3A
01D2 : FF                 # CMD_END
01D3 : ################### SP_DCSQ 8 = 0x8
01D3 : 02 BF              # SP_DCSQ_STM => start frame: 240
01D5 : 01 EE              # SP_NXT_DCSQ_SA = 494 = 0x1EE
01D7 : 07 00 10           # CHG_COLON (Extended field size = 16 = 0x10)
01DA : 00 02 10 C8        #   LN_CTLI 0: n=1 csln=2 ctln=200
01DE : 00 66 10 10 FF FF  #     PX_CTLI 0: cspn=102 col= 0 1 0 1 cntr=F F F F
01E4 : 0F FF FF FF        #   LN_CTLI Termination Code
01E8 : 06 00 0C 00 3B     # SET_DSPXA uf=0xC bf=0x3B
01ED : FF                 # CMD_END
01EE : ################### SP_DCSQ 9 = 0x9
01EE : 03 17              # SP_DCSQ_STM => start frame: 270
01F0 : 01 EE              # SP_NXT_DCSQ_SA = 494 = 0x1EE
01F2 : 07 00 06           # CHG_COLON (Extended field size = 6 = 0x6)
01F5 : 0F FF FF FF        #   LN_CTLI  Termination Code
01F9 : 02                 # STP_DSP
01FA : FF                 # CMD_END
01FB : FF                 # Stuffing Byte => even SP size
```

FIG. 7

CODING METHOD FOR PICTURE SEQUENCE OR SUB-PICTURE UNIT

BACKGROUND OF THE INVENTION

The invention relates both to a method for coding a picture sequence and, furthermore, to a corresponding sub-picture data unit for use in an electronic appliance. In addition, the invention relates to a data storage medium, on which a sub-picture data unit according to the invention is stored.

Various picture coding methods are known from video technology. The method proposed here for coding of a picture sequence is based on a picture coding method which is used for producing so-called sub-picture data units for DVD appliances. Such DVD appliances are already commercially available and each contain a sub-picture decoding device (or sub-picture decoder) which can process the said sub-picture data units. A description of the picture coding method used there can be found, for example, in the DVD Standard "DVD Specification for read-only disc", part 3, video specification, Version 1.0, August 1996, Section 5.4.3 Sub-picture unit (SPU). A detailed description of the said sub-picture decoder devices can be found, for example, in EP-A-0 725 541.

According to the DVD Standard, the main application for sub-picture data units is, for example, the generation of subtitles on a television screen. The subtitles can then be overlaid anywhere in the picture, and they are generally overlaid at the lower edge of the picture. The bitmap data for in each case one subtitle are then stored in the sub-picture data unit SPU. In order to define the location of a subtitle on the screen, and to define a number of display characteristics, in particular the colour, transparency etc., simple graphics control instructions are specified in the said DVD Standard. Thus, with skilful programming, sub-picture data units can in principle also be used for other purposes, for example for control instructions, operator guidance menus, animation pictures and screen savers etc.

The essential parts of a sub-picture data unit according to the DVD Standard comprise a data field for the bitmap data of the text to be displayed or, in more general form, the object to be displayed, as well as a second part in which so-called control instruction sequences are stored, which define the display location, the display time and the display characteristics of the stored object. Furthermore, a number of objects can also be stored successively in the data field for the bitmap data, and can each be called up at different times. If a number of objects are intended to be provided in a sub-picture data unit, then the DVD Standard specifies that a corresponding area must in each case be provided in the bitmap data field for each object. The bitmap data are then still run-length coded in order to achieve picture compression and to save memory space. While precautions are already taken in the said DVD Standard, as to how a text can be run through in the vertical direction in the overlaid sub-picture window using the existing display control instruction set, there is no information as to how it is possible to allow a text to be run through in the horizontal direction in the sub-picture window. Running through a text in the horizontal direction is often also referred to as running script, and can frequently be seen in some television programmes. One example which may be mentioned is the process of continuously running through stock market figures by television programme providers such as NTV.

Persons skilled in the art will very soon have the capability to use such running scripts in DVD appliances as well, utilizing the specified sub-picture data units, such that either a separate sub-picture data unit is stored for each individual frame of such a running script, or a sub-picture data unit would have to be provided for a number of phases of the running script, containing a correspondingly large number of bitmaps for the individual phases of the movement, which are then called up individually. As can be seen, these solutions are very memory-intensive. In any case, owing to the limitation in size of sub-picture data units to 53220 bytes, the second solution is feasible only for relatively short running scripts.

SUMMARY OF THE INVENTION

One object of the invention is to specify a method for coding a picture sequence which, based on the display control instructions which have already been defined in the DVD Standard, and based on the rules for constructing sub-picture data units, allows horizontal movement of an object to be provided in the sub-picture display window while using the memory efficiently.

In the method according to the invention for coding a picture sequence, the object picture is broken down into a number of segments of equal size by means of vertical cuts. The pixel data of two respective adjacent segments are then combined, with a combined pixel being produced in each case from corresponding pixels in the parts to be combined, in such a way that the combined pixel is assigned a unique type, which corresponds to the distribution of the pixel values in the pair of corresponding pixels. In addition, such combined picture pieces are run-length coded section by section. This is done in such a way that a separate run-length coding is carried out in each case for the combined pixels in a section of running script/object. The size of the detail in this case corresponds to the number of pixels through which it is intended to move the object in the horizontal direction in each movement phase. That is to say, for example, if it is intended to move the object through 8 pixels from right to left in each movement phase, a separate run-length coding must in each case be carried out for each 8 pixels for all the lines of the object detail. By appropriately placing a pointer on the respective object detail, it is then a simple matter during the decoding of the picture sequence to produce a picture sequence which, when output, gives the viewer the impression of a horizontal movement of the object relative to the window, in a window on a display appliance. This specific type of combined coding of adjacent segments of the object picture, and the specific type of run-length coding, allow the memory requirement for the resultant sub-picture data unit to be considerably reduced. Specifically, there is no longer any need to provide a dedicated bitmap for each phase of the movement, but only a considerably smaller number, with there being approximately as many bitmaps as the number of segments which are also produced by vertical cuts. Although this may result in somewhat more run-length code words in the combined object picture parts, the reduction in the bitmap areas required is, however, considerable, so that considerably less memory space is required in any case.

The measure according to which the size of the object segments corresponds to the size of the object details to be displayed is an optimization process, by means of which the number of segments is limited to a small amount.

The measure according to which two picture parts to be combined are initially shifted through two pixels in the vertical direction with respect to one another before they are combined ensures that the correct pixels are always joined together seamlessly when, after moving the pointer for the start of the run-length decoding in a line, pixels in the lower and upper of the two combined picture pieces follow one another. The picture quality is thus optimized.

The measure according to which a combined picture piece is moved with respect to the previous and next combined picture piece through the number of pixels through which the object is moved in each step in the horizontal direction results in the advantage of a further reduction in the memory required. Specifically, this is due to the fact that the redundant positions in the individual bitmap areas are in this way eliminated.

A sub-picture data unit according to the invention for use in an electronic appliance which contains a coded picture sequence which has been coded in accordance with the method according to the invention for coding of a picture sequence has the fundamental structure such that it contains a data area for the pixel values of the individual pictures in the picture sequence, and an instruction area for display control instruction sequences. The invention then provides that display control instruction sequences are provided for producing the horizontal movement of the object and each contain one instruction, by means of which the start of the run-length decoding for a picture is in each case moved by a number of pixels corresponding to the desired movement of the object. The display control instruction SET_DSPXA defined in the DVD Standard can advantageously be used for this purpose. An instruction which defines the way in which the combined pixels are to be evaluated is likewise provided in each of the display control instruction sequences for reproduction of a picture.

In the case of DVD sub-picture data units, the instructions SET_CONTR or CHG_COLCON defined in the DVD Standard can be used for this purpose.

Finally, the invention covers a data storage medium, in particular a DVD disk, which contains a sub-picture data unit stored according to the invention.

BRIEF DESCRIPTION OF THE DRAWING

Exemplary embodiments of the invention will be explained in more detail in the following description and are illustrated in the drawings, in which:

FIG. 7 shows a simple example of a sub-picture data unit according to the invention;

DESCRIPTION OF THE PREFERRED EMBODIMENTS

Figure 1:
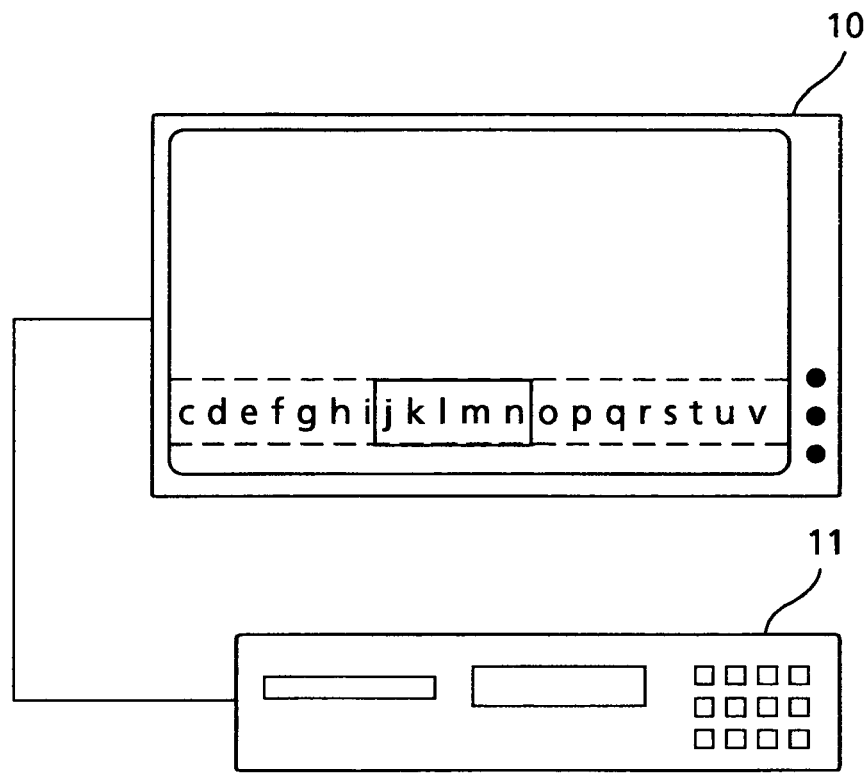
FIG. 1 shows a DVD player and a television set which is connected to it and is displaying an overlaid running script.

The invention will be explained using the example of a DVD appliance. In FIG. 1, reference number 10 denotes a conventional TV set. A DVD player is denoted by the reference number 11. This DVD player is connected to the TV set 10, for example via a Scart cable. The DVD player 11 produces the analogue television signal, which is fed to the TV set. The reference number 12 denotes a display window, in which a running script is overlaid. The running script can move either from left to right in the display window 12 or, conversely, from right to left. The dashed illustration indicates that the running script is in each case displayed only section by section in the display window. The entire running script is in this case displayed such that it is actually so long that it could not be displayed completely on the screen. According to the DVD Standard, a subtitle is mainly overlaid on the television picture in a display window 12. One sub-picture data unit (SPU) is in each case used for each subtitle for this purpose.

Figure 2:
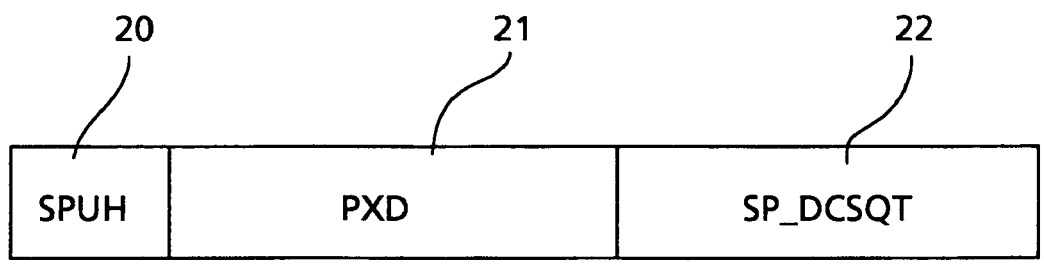
FIG. 2 shows an example of the known frame format for the data in the sub-picture data unit.

FIG. 2 shows the known data format of a picture data unit in rough outline. The reference number 20 denotes a data field for a header part (SPUH) of the sub-picture data unit. The reference number 21 denotes a data field for the compressed pixel data (PXD) of the sub-picture. The reference number 22 also denotes a data field for a display control instruction sequence table (SP_DCSQT). So-called display control instruction sequences (SP_DCSQ) are stored in the data field 22. The terms which have been mentioned as well as the various display control instructions are defined in the DVD Standard (Version 1.0) mentioned initially, so that the details do not all need to be explained for the disclosure of the invention. However, reference is expressly made to this publication with regard to the disclosure of the invention.

The pixel data in the data field 21 govern the displayed pattern of the displayed sub-picture. For each pixel in a line of the sub-picture, a 2-bit long data word is used to indicate whether this is a background pixel, a foreground pixel (pattern pixel) or whether the pixel must be emphasised in a first way (emphasis-1 pixel) or in a second way (emphasis-2 pixel). These four differences can be defined by two bits. In this case, in detail, the binary value meanings are as follows:

00=background pixel
01=foreground pixel
10=pixel displayed with emphasis 1
11=pixel displayed with emphasis 2

It must be remembered in this case that the individual pixel data items are not stored in this raw form in the memory, but are stored in compressed form. Run-length coding is carried out for this purpose. The run-length coding method is likewise explained in very great detail in the said DVD Standard (1.0). The said DVD Standard defines 7 coding rules for run-length coding. In this case, the run-length coding works in such a way that one line of a field of the sub-picture to be displayed is run-length coded in each case. The individual rules will not be explained in any more detail here, however, since these are known sufficiently well from the said DVD Standard. Run-length coding achieves a relatively large amount of compression for simple picture contents.

The method according to the invention for coding a picture sequence will be explained in the following text using the example of a running script. The method according to the invention can be used, of course, not only to produce a running script but also, instead of this, to display any desired other object section by section in a window, so that it will be possible to identify a relative movement between the object and the window in the horizontal direction in that window. First of all, the object, that is to say the entire running script in this example, is broken down by vertical cuts. Each part is in this case chosen to be of the same size. The size of a part also corresponds to the size of the display window in which it is intended that the running script will later be overlaid. This applies in particular to the extent of each part in the horizontal direction. Once the running script has been broken down into segments, two adjacent segments are then in each case combined with one another. This process is also illustrated in more detail in FIG. 10. It can be seen in the upper part of FIG. 10 that a running script has been broken down into nine segments, with the ninth segment no longer being of the same size as the previous segments and, for this reason, being artificially enlarged by being filled with background pixels so that a segment of the same size is likewise once again produced. The first two picture segments are then combined with one another. This results in the combined picture piece K1. Next, the second and third segments are then combined with one another, producing the combination K2. Once again, the third and fourth segments are then combined with one another. This results in the combination K3 etc., until, finally, the eighth and ninth segments of the running script are combined with one another as the last combination K8.

Figure 3:
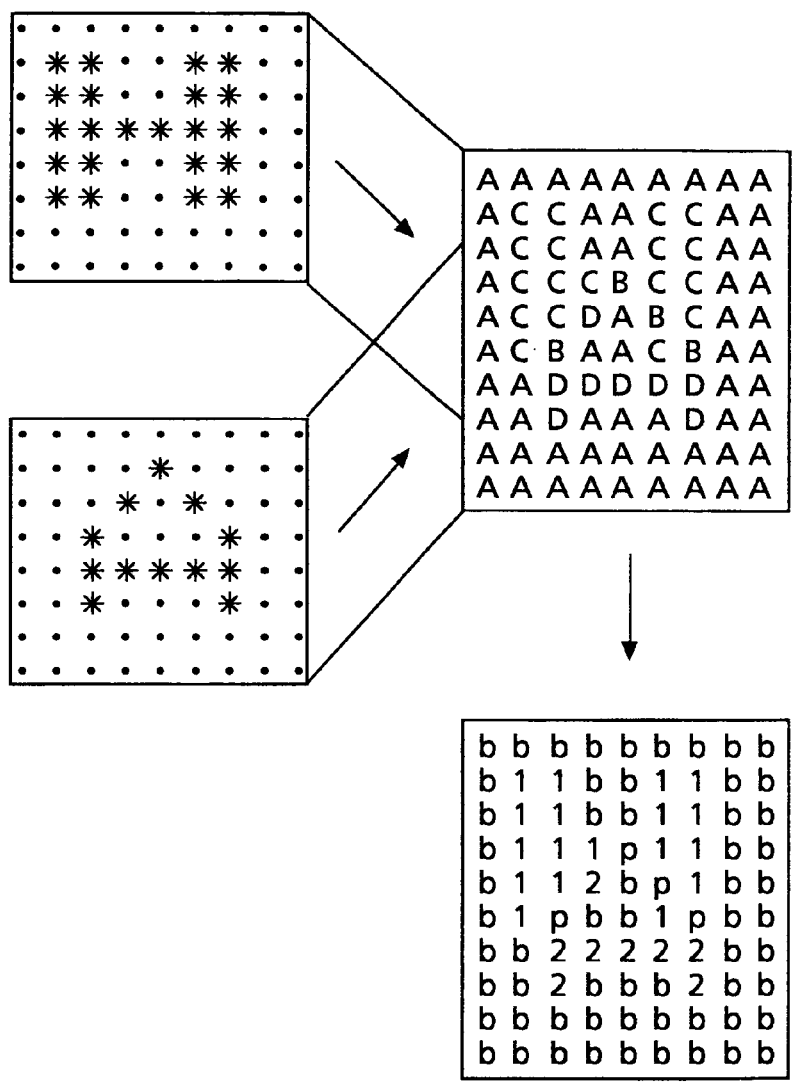
FIG. 3 shows an illustration to explain how two object picture sections are combined with one another.

Two object picture segments are in this case combined as shown in FIG. 3. In FIG. 3, one picture segment in this case contains the letter H, and the other picture segment contains the letter A. These letters are then intended to be written one behind the other in the running script. The two picture parts to be combined are shown one above the other in the left-hand part of FIG. 3. The pixels of the letter are each marked by *, and the pixels of the background of the respective picture segment are marked by single dots. Thus, in this case, it is assumed that a pixel can assume only two values, namely simply whether the pixel is stimulated to illuminate, which corresponds to the "on" state, or not, which corresponds to the "off" state. The two illustrated picture parts each comprise 9×8 pixels. When these picture pieces are combined, this can be thought of as placing one piece over the other, so that the picture elements are superimposed. In the illustrated example, the two picture pieces are not placed one on top of the other such that they match, but are shifted through two pixels with respect to one another in the vertical direction. This is necessary to ensure that they are output in the correct lines when the combined picture pieces are subsequently decoded, and this will be explained in more detail in the following text. The shifting of the picture sections one above the other is indicated by dashes in FIG. 3. The pixels which have been placed one on top of the other are then combined in accordance with the following rules:

If the pixels to be combined are both in the "off" state, then the combined pixel at this position in the combined picture piece is assigned the pixel type A. If the pixels to be combined both have the value "on", then the combined pixel for this position is assigned pixel type D.

If the lower pixel has the value "on" and the pixel located above it has the value "off", then the pixel at this position in the combined picture piece is declared with the pixel type C.

If the value of the lower pixel is "off" and that of the pixel located above is "on", then the combined pixel is assigned pixel type D. The result of this pixel combination is shown in the top right of FIG. 3.

The lower part of FIG. 3 then shows how the four pixel types A–D are allocated to the pixel types "background" b, "pattern" p, "emphasis 1" and "emphasis 2" defined in the DVD Standard. Pixel type A becomes a "background pixel", pixel type B becomes a "pattern pixel", pixel type C becomes an "emphasis-1 pixel" and pixel type D becomes an "emphasis-2 pixel". The corresponding pixel types are shown at the bottom of FIG. 3. This allocation process should be regarded only as an example for the purposes of the invention. 4!=24 different allocations are possible in terms of possible permutations of the four pixel types.

The picture piece combined in this way is thus complete and is then also run-length coded in order to produce a sub-picture data unit that complies with the DVD Standard. However, according to the invention, the run-length coding is not carried out to optimize the memory requirement for a complete line of the combined picture piece, but is processed using a specific type of run-length coding, which will be explained in more detail with reference to FIG. 4.

Figure 4:
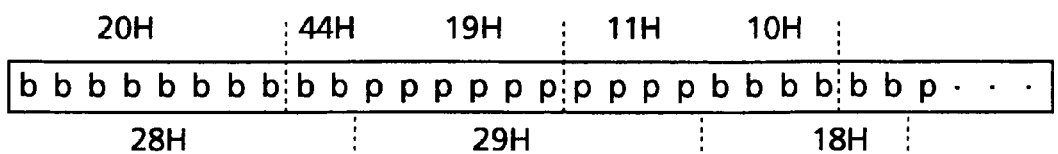
FIG. 4 shows a run-length coded line of an object picture detail.

FIG. 4 shows an example of a line of a combined picture piece. The lower part of FIG. 4 shows the run-length code words for the illustrated line in the situation where the run-length coding is optimized for the memory requirement. As can be seen, a run-length code word is in each case formed per number of pixels of the same type (B or P). However, according to the invention, separate run-length coding is now always carried out for eight successive pixels, instead of this. The dashed lines in the upper part of FIG. 4 each form the boundary between a section of eight successive pixels. The first section shown contains only type b pixels. The hexadecimal number 20H is accordingly formed as the run-length code word. This is followed in the second section by another two type b pixels followed by six type p pixels. Two run-length code words are therefore formed here. Firstly 44H for the two type b pixels, and 19H for the six successive type p pixels. This is followed in the third section by four type p pixels and then four type b pixels. The associated run-length code words are 11H and 10H. Thus, on the basis of this method according to the invention, separate run-length coding is carried out for a specific number of pixels. In the illustrated example, separate run-length coding has been carried out for each eight pixels, since the example is constructed such that the running script is intended to move onwards by eight pixels in the horizontal direction from step to step. If even finer resolution of the movement is required in another example, for example with only four pixels per step, then run-length code words would each have to be calculated separately for four pixels in each line. A step can in this case be carried out for each new video frame, or else only for every N frames where N=1, 2, 3, 4, . . .

Figure 5:
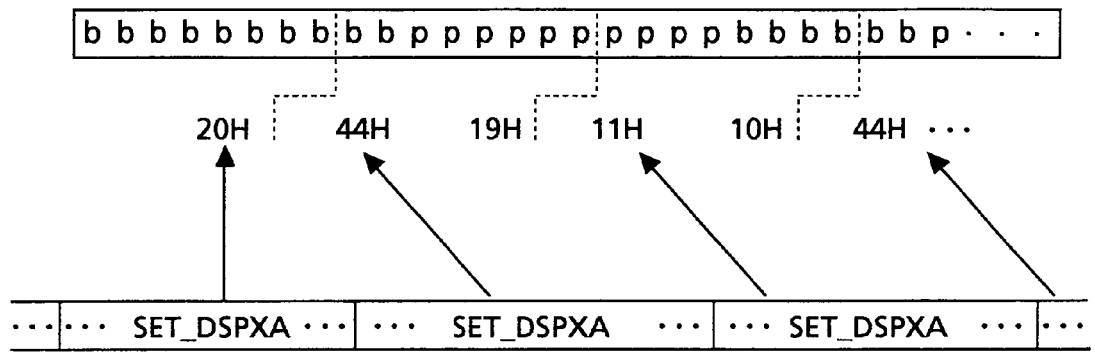
FIG. 5 shows an illustration of how the SET_DSPXA instruction in the display control instruction sequences points to the first run-length code word of different details.

The DVD Standard which has been mentioned defines a display control instruction using which it is possible to predetermine the memory address at which the run-length decoding is intended to start for the sub-picture to be displayed. This instruction is the SET_DSPXA instruction. This is the instruction which is used to produce the horizontal movement, for example the running script, in a sub-picture data unit according to the invention. Namely, a specific display control instruction sequence SP_DCSQ is then provided for each movement step in a sub-picture data unit according to the invention. Each of these display control instruction sequences in this case uses the SET_DSPXA instruction to shift the PXD pointer for the start of the run-length decoding in such a way that the run-length decoding starts K pixels further to the right in the bitmap, with K being the number of pixels through which the running script is intended to move horizontally per step. This is symbolized by arrows in FIG. 5. In the example shown in FIG. 5, K is equal to the number 8. In the first display control instruction sequence, the SET_DSPXA instruction points to the run-length code word 20H. In the next display control instruction sequence, the instruction points to the run-length code word 44H, and in the next display control instruction sequence it points to the run-length code word 11H, etc. The run-length decoding thus always starts further to the right in the line being displayed. Different pixels from the running script are thus always displayed in succession.

Figure 6:
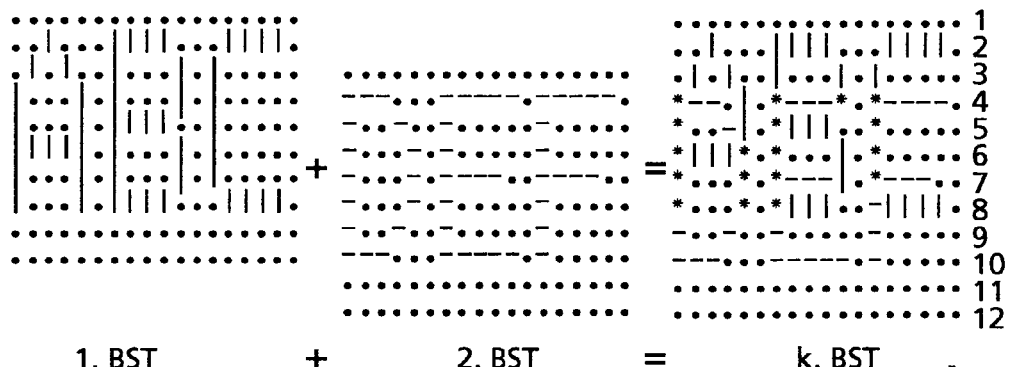
FIG. 6 shows the combination of two picture details for the example of a sub-picture data unit as shown in FIG. 7.

FIGS. 6 and 7 show an example of a sub-picture data unit according to the invention for a DVD player. The letters A, B, C, D, E, F are stored as a single combined picture piece in the bitmap of the sub-picture data unit shown in FIG. 7. The type of combination is in this case shown in FIG. 6. The left-hand part of FIG. 6 shows the pixel pattern for displaying the letters A, B, C. The background pixels are in this case marked by a single dot, and the pixels which produce the pattern of the letters are marked by a vertical line. In a corresponding way, the centre part of FIG. 6 shows the pixel pattern for the letters D, E, F. The background pixels are likewise marked by single dots in this case, and the pixels for producing the letter pattern are in this case marked by a horizontal line. The shifting of the two parts with respect to one another through two pixels in the vertical direction can also be seen. If the two picture parts are placed one on top of the other, then this results in the pixel pattern as shown in the right-hand part of FIG. 6. The single dots mark the pixel type where the two corresponding pixels are background pixels. The vertical line marks the pixel type where the lower pixel is switched on and the upper pixel is switched off. Horizontal lines mark the pixels where the lower pixel is switched off and the corresponding upper pixel is switched on. In addition, stars mark the pixels where the upper and lower pixels are both switched on.

The run-length code words for this combined picture piece are stored in the PXD data field of the sub-picture data unit. In this example, the run-length code words have each been determined separately for two successive pixels. When this sub-picture data unit is being decoded, this then results in a slow movement of the text from right to left at two pixels per step. It must also be remembered that different bitmap areas are stored in the PXD field of the sub-picture data unit shown in FIG. 7 for the first and second fields of a video frame. The run-length code words for the lines 1, 3, 5, 7, 9 and 11 are thus stored in the first field, and the run-length code words for the even-numbered lines are stored in the bitmap for the second field. The run-length code words for the combined picture piece for the first field are located in the memory starting at the address 0004H:. FIG. 7 shows the hexadecimal addresses without the addition of the letter H. The run-length code words for the second field are located in the memory starting at the address 0033H:. The PXD area is filled with zero byte entries starting at the address 0060H: in order to satisfy the rule specified in the DVD Standard that the PXD area, including the SPU header area, which has a size of 4 bytes, must not be less than half the total SPU size. The PXD area is followed by the area with the display control instruction sequences. This area is also referred to as the display control instruction sequence table SP_DCSQT. The following process now takes place in the first display control instruction sequence SP_DCSQO: the SP_DCSQ_STM instruction is used to indicate that the display of the picture is intended to start directly when the sub-picture data unit SPU is called up. The next display control instruction SP_NXT_DCSQ_SA indicates where the next display control instruction sequence SP_DCSQ1 is stored. The next display control instruction SET_DSPXA now stipulates that the run-length decoding for the first field is intended to start at the address 004FH:, and the decoding for the second field is intended to start at the address 0033H:. The display control instruction SET_COLOR after this stipulates that all the pixels of pixel types b and p are regarded as background, and are intended to be displayed using a different colour. Furthermore, this instruction stipulates that all pixels of pixel types 1 and 2 are defined as foreground pixels, and are intended to be displayed in a corresponding different colour. The next instruction SET_CONTR makes the contrast 100% visible for all the pixel types b, p, 1, 2, that is to say all the pixels in the display window for the sub-picture data unit are set to be fully visible. The next instruction SET_DAREA indicates the size of the visible window and defines the location where the window will appear on the screen. In the illustrated example, the top left-hand corner of the visible window is located at the picture coordinates (100, 150), and the bottom right-hand corner is located at the pixel coordinates (117, 159). The next instruction STA_DSP starts the display of the first frame. The next instruction CMD_END indicates the end of the first display control instruction sequence SP_DCSQ0.

The second display control instruction sequence is then processed. The SP_DCSQ_STM instruction now stipulates that the process of outputting a new frame is intended to be displayed in accordance with this display control instruction sequence at the 30th frame after the start of the sub-picture data unit. The next SP_NXT_DCSQ_SA instruction once again refers to the memory address starting from which the next display control instruction sequence SP_DCSQ2 is stored in the memory. This is followed by the next instruction, CHG_COLCON. This instruction is used, within the visible window, to stipulate which pixels are to be included as pixels in the lower picture piece in the combined picture piece, and which are to be included as pixels in the upper picture piece in the combined picture piece. The CHG_COLCON instruction also has 3 successive subsections. These are referred to by the abbreviation LN_CTLI, PX_CTLI and LN_CTLI Termination Code. The code word for the CHG_COLCON instruction consists of just one byte, namely 07H. This is followed by a statement as to how far the CHG_COLCON instruction extends subsequently. The display control instruction sequence SP_DCSQ1 indicates that there are a further 16 bytes associated with the CHG_COLCON instruction. The CHG_COLCON instruction can be used to change the colour and contrast levels for specific areas within the display window in which the sub-picture is intended to be displayed. The statement LN_CTLI provides the information on how many changes in the colour and contrast levels are intended to be set by the instruction, and the statement N=1 in the example shown here means that there is only one change. This thus also indicates the area on the screen to which the changes are intended to apply. In the illustrated example, the statement clsn=2 means that changes are intended to apply starting from the second video line. The statement ctln=200 defines the fact that the change is intended to apply as far as the 200th video line. In practice, however, the change applies only in the area in the display window of the sub-picture data unit. This was in fact defined in the first display control instruction sequence SPU_DCSQ0 in such a way that it extends from pixel position 100 in video line 150 to pixel position 117 in video line 159. The next information item PX_CTLI0 now indicates that column in the previously defined video line area from which a change to the colour and/or contrast levels is intended to start. The statement cspn=116 defines that a change is intended to start from the 116th pixel position. The next statement col=0 1 0 1 defines that the colour level 0 is now intended to be selected for the pixel type b, the colour level 1 is intended to apply to the pixel type p, the colour type 0 is intended to apply to the pixel type 1, and the colour type 1 is intended to apply to the pixel type 2. This is different to the definitions in the first display control instruction sequence. The statement CNTR=F F F F defines that the contrast is set as before for all the pixel types, such that the pixel types are fully visible. With regard to the contrast levels, there is thus no change from the statements in the first display control instruction sequence. Finally, this is followed by the end code for the CHG_COLCON instruction. This instruction is used to state that there are no further changes to be set from then on. This CHG_COLCON instruction thus means that the evaluation of the combined picture piece in the previously defined display window up to and including column 115 is carried out as stated in the first display control instruction sequence SP_DCSQ0. Starting from column 116, the pixels are then intended to be evaluated differently. This means that, starting from column 116, instead of the lower picture piece in the combined picture piece, the bitmap data are evaluated such that the upper picture piece is reproduced. The final instruction SET_DSPXA in the second display control instruction sequence SP_DCSQ1 now sets the pointer to the start of the run-length coding within the PXD area such that evaluation is intended to start for the first field from the address 0005H:, and for the second field from the address 0034H:. Decoding is thus no longer carried out starting from the same address as in the first display control instruction sequence, but, in fact, one byte later in each case. This is equivalent to shifting the letter sequence which is output in the display window by two pixels to the left since, in fact, the run-length code words have each been formed separately for two successive pixels. The data in the PXD field shows how the PXD pointer is moved. Namely, the first byte at the address 0004H: is no longer evaluated. This is then followed by eight data bytes with the value 44H. These are the code words for in each case two successive background pixels. Thus, during decoding, 16 background pixels are output in the first line. This is then followed by the data byte 46H. This data byte, however, in fact corresponds to the first data byte for the third video line, when decoding would be carried out starting from the address 0004H:, where a background pixel and a foreground pixel thus follow one another for the lower picture piece. After run-length decoding, this then means that a pixel of type b and a further pixel of type 1 must be output here. Since, in accordance with the CHG_COLCON instruction, both of these two types should be regarded as background pixels, two background pixels are thus likewise output at the two pixel positions in columns 116 and 117. It must be remembered that these last two pixels correspond to the first two pixels in the upper picture piece in the combined picture piece. This is due to the fact that the two picture pieces have been moved with respect to one another through two pixels in the vertical direction. This movement thus guarantees that the correct pixels are always joined to one another seamlessly. This analysis is likewise applicable to the output for the second field.

In the subsequent display control instruction sequences, appropriate measures are now taken to move the running script further. The area starting from which the pixels need to be evaluated differently is successively chosen to be ever larger. In the third display control instruction sequence SP_DCSQ2, the different evaluation starts from column 114. The area moves further and further to the left, by two pixels for each display control instruction sequence. By the ninth display control instruction sequence SP_DCSQ8, this area is so large that the different evaluation actually starts from pixel column 102. Accordingly, the PXD pointer is also moved on by one address per display control instruction sequence. In the ninth display control instruction sequence SP_DCSQ8, this pointer is at the address 000CH: for the first field, and is thus at the last data byte 44H of the first video line.

In the final display control instruction sequence SP_DCSQ9, the PXD pointer is then no longer moved. There is likewise no further movement of the pixel evaluation with the CHG_COLCON instruction. This display control instruction sequence is used only to end the display of the sub-picture data unit. The STP_DSP instruction is used for this purpose. To make the lower picture piece completely visible, an additional display control instruction sequence would also have to be provided, so that the implementation of the evaluation starts from the pixel column 100, combined with the PXD pointer being moved to the next data entry.

The described sub-picture data unit thus produces a slow movement of the running script with the letters A, B, C, D, E, F, with an onward movement of virtually two pixels per second. This is due to the fact that a movement takes place only once in 30 video frames. This movement could, of course, be speeded up if the changes were intended to be displayed at shorter intervals.

The movement direction for the running script can also be very easily reversed in the same way. In this situation, the PXD pointer would have to be moved in the opposite direction, with the CHG_COLCON instruction being appropriately adapted, so that the area where different evaluation is intended to be carried out is enlarged successively from left to right. In the illustrated example, only a very short running script was produced, for the sake of simplicity. The statements below must now also be observed, for longer running scripts.

Figure 8:
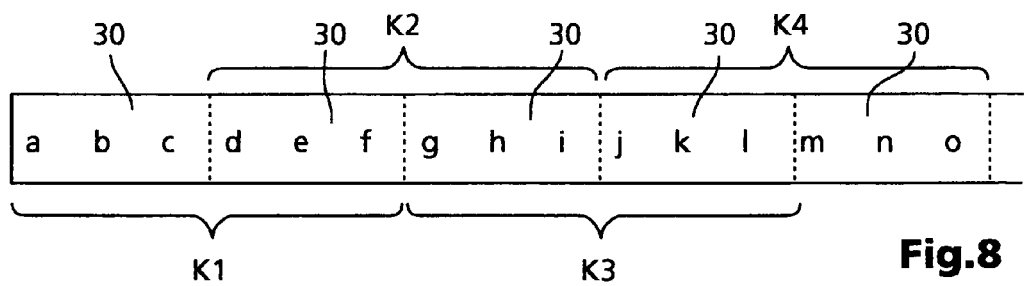
FIG. 8 shows the combination of picture pieces of a running script according to a first exemplary embodiment.

For this purpose, reference is made to FIG. 8. This shows a longer running script, extending from the letter a to the letter o. Three letters from this running script are in each case always intended to be displayed in the correspondingly selected display window. The entire running script must then be subdivided into areas of equal size by vertical cuts, with each of these areas always including three letters. Two successive parts are then combined with one another and are stored in an associated bitmap in the memory. This is indicated by curved brackets in FIG. 8. This results in a first combined picture piece having a corresponding first bitmap. The letters a, b, c and d, e, f are stored combined in this first bitmap. The letters d, e, f and g, h, i have then been combined in the second combined picture piece, etc. The combined picture pieces can be entered successively in the PXD area of the memory. Once the first combined picture piece with the first bitmap has been completely processed, as explained above, so that only pixels in the second picture piece are visible during movement from right to left, the process of displaying the next combined picture piece is then started. The second bitmap is thus then called up in a following display control instruction sequence. From this point, the procedure is then the same as that for the first two picture pieces. The procedure for the remaining combined picture pieces is analogous, until the final combined picture piece has been processed. The described method also likewise makes it possible to run through horizontally in a varying manner (for example with direction changes, varying movement speeds, etc.) in a simple manner, with appropriately adapted run-length coding.

In the example explained here it has been assumed that the combined picture pieces are stored separately in two fields in the PXD area, and are addressed separately via the SET_DSPXA instruction. However, the method is just as suitable for producing horizontal movement, in which the SET_DSPXA instruction for both fields is set to the same memory address in the PXD area. This method is also used, and is referred to by the term "field repetition".

Figure 9:
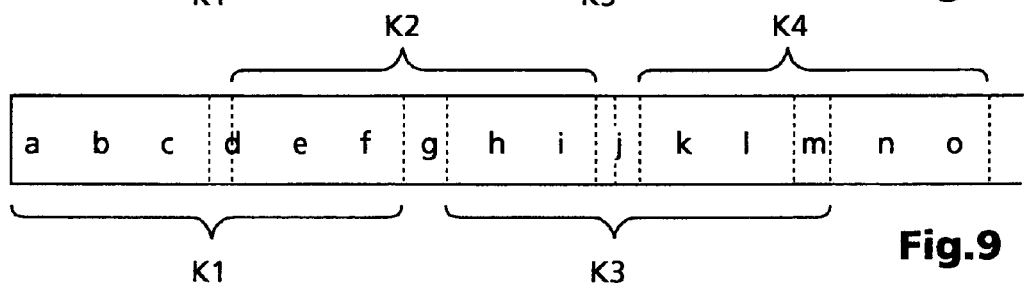
FIG. 9 shows the combination of picture pieces of a running script according to a second exemplary embodiment of the invention.

The said coding method for coding a picture sequence can be refined even further. For example, the arrangement of the combined picture pieces can also be optimized. Specifically, in the example shown in FIG. 8, for example, when movement takes place from right to left, the picture which is output based on the combined picture piece K1 with the output position shifted all the way to the left matches the picture which is output based on the combined picture piece K2 with the output position shifted entirely to the right, and thus exists in a redundant form. Thus, if the aim during a transition from one combined picture piece to the next is for the picture likewise to be moved through the defined number of pixels from right to left, then this can be done in such a way that the second combined picture piece is moved through the corresponding number of pixels to the right with respect to the previous picture piece. This is illustrated in FIG. 9. In the same way as the picture pieces K2 and K3, and K3 and K4, the combined picture pieces K1 and K2 are each additionally shifted through 8 pixels with respect to one another compared with the illustration in FIG. 8. This additionally has the advantage that, in consequence, either fewer combined picture pieces are required overall, and thus less memory is required for the PXD area, or the last combined picture piece contains fewer foreground pixels, which in turn allows the run-length coding to be carried out in a manner which reduces the memory requirement. This is shown in FIG. 10.

Figure 10:
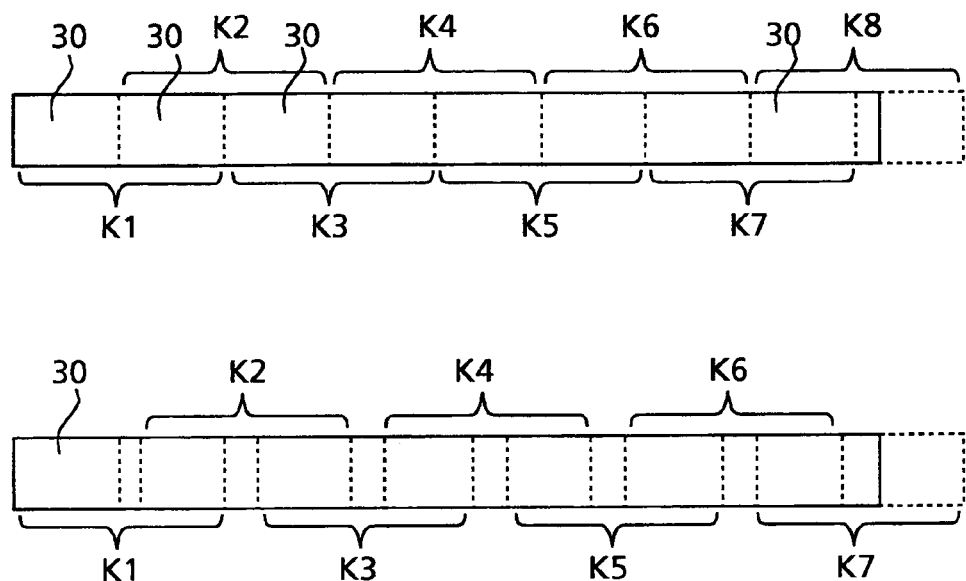
FIG. 10 shows an illustration to explain the different memory size which is required for the types of combination shown in FIGS. 8 and 9.

In the upper part of FIG. 10, the picture pieces are combined as shown in FIG. 8. Eight combined picture pieces are thus required for all the running script, corresponding to the solid line. In the lower part of FIG. 10, the combination process has been carried out as shown in FIG. 9. As can be seen, only seven combined picture pieces K1–K7 need be stored. As has also already been explained above, the illustration likewise shows that the last picture piece is filled with background pixels if the last picture piece is not of the same size as the previous picture piece in order that any form of combination is possible at all. This area is represented by dashed lines. This results in unused picture areas in the upper picture piece in the last combined picture piece K7. There is thus no longer any need for special run-length coding for this unused area, that is to say the run-length coding of the unused area can be coded in an entirely normal manner, that is to say purely to minimize the memory required. The only limitation is that the specific run-length code word "Till-end-of-line" must not be used, since this would result in faulty coding because the PXD pointer is in fact successively moved on ever further, and the line end thus changes continually.

Figure 11:
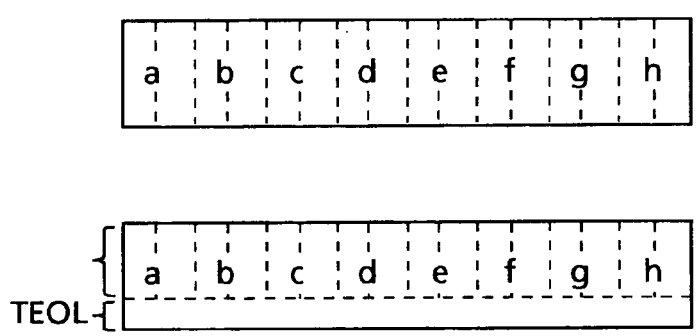
FIG. 11 shows an illustration to explain how additional memory space can be saved by skilful coding of the last lines of a running script.

Further reduction in the memory requirement can be achieved if the last lines of an object, for example of a running script, are run-length coded in a simpler manner. This is shown in FIG. 11. If the lower lines of the object picture contain only one pixel type (for example only background pixels), then the run-length coding of this area can be greatly simplified. All the last lines with only one pixel type in each field are coded exclusively using the run-length code word "Till-end-of-line". Furthermore, a "Till-end-of-line" code word is also attached to each field. The previously explained method for run-length coding is shown schematically in the upper part of FIG. 11. On this basis, all the lines are dealt with in the same way, and associated run-length code words are produced separately for all the details. This also applies to the last lines, even though they contain only background pixels. It can now be seen in the lower part of FIG. 11 that the last lines, marked by curved brackets and the reference symbol TEOL, are coded using the code words "Till-end-of-line". No more foreground pixels occur in these lines.

The method according to the invention for coding a picture sequence and, accordingly, the sub-picture data units according to the invention as well, can be used in all those appliances which contain the said sub-picture decoder in accordance with the DVD Standard as a component. These are thus, in particular, DVD appliances including DVD-RAM and DVD-recordable, and possibly also including television receiving appliances such as set-top boxes or, for example, camcorders as well.

What is claimed is:

1. A method for coding a picture sequence for horizontal motion on a display screen, said method comprising the steps of:
   dividing said picture into a number of segments of equal size by means of vertical cuts;
   combining pixel data of two respective adjacent segments, with a combined pixel being produced from corresponding pixels in the segments to be combined;
   assigning a unique type to said combined pixels which corresponds to the distribution of the pixel values in the pair of corresponding pixels; and,
   defining a number of combined pixels in each line of said picture to be separately run-length coded, said defined number of combined pixels corresponding to the number of pixels through which the picture is moved per movement step in the horizontal direction.

2. Method according to claim 1, wherein the size of the segments (30) corresponds to the size of the object details to be displayed.

3. Method according to claim 1, wherein the two respective adjacent segments are shifted through two pixels in the vertical direction with respect to one another before they are combined.

4. Method according to claim 1, wherein the two respective adjacent segments are shifted through one pixel in the vertical direction with respect to one another before they are combined.

5. Method according to claim 1, wherein a combined picture piece is moved with respect to the previous and the next picture piece through the number of pixels through which the object is moved per picture in the horizontal direction.

6. Method according to claim 1, wherein the pixels of the pictures can assume only two values, referred to in the following text as the "on" and "off" values.

7. Method according to claim 1, wherein the following four different pixel types are provided:
   if the corresponding pixels both have the value "off", then the combined pixel value is allocated the type A;
   if the corresponding pixels both have the value "on", then the combined pixel value is allocated the type B;

if the pixel in the first picture segment has the value "on" and the pixel in the second of the picture segments to be combined has the value "off", then the combined pixel value is allocated the type C;

if the pixel in the first of the two picture segments to be combined has the value "off" and the pixel in the second of the two picture segments to be combined has the value "on", then the combined pixel value is allocated the type D.

8. Method according to claim 1, wherein the picture segments to be combined are combined such that they only partially overlap, and missing pixels outside the overlapping area are assigned the value "off".

9. A method for coding a sub-picture data unit, said method comprising the steps of:

defining a sub-picture sequence having a data area for pixel values of said sub-pictures of said sequence; and, defining an instruction area having control instructions for display of said sub-picture sequence, said control instructions including address pointers that determine where in said data area a run-length decoding is to start, wherein said address pointers of successive ones of said control instructions are chosen such that said run-length decoding starts at predetermined different addresses in the sub-picture to cause a predetermined motion and direction of the sub-picture formed within a display picture.

10. The method according to claim 9, further comprising the step of defining the sub-picture data unit for use in a DVD appliance.

11. The method according to claim 10, further comprising the step of defining the control instruction sequences to contain a display control instruction SET_DSPXA defined in a DVD standard in order to shift the run-length decoding pointer.

12. The method according to claim 10, further comprising the step of assigning to each type of pixel, in a mathematically unique manner, a pixel type selected from the group consisting of "Background Pixel", "Pattern Pixel", "Emphasis-1 Pixel" and "Emphasis-2 Pixel".

13. The method according to claim 10, further comprising the step of using a control instruction selected from the group consisting of SET_COLOR and CHG_COLCON in a display control instruction sequence (SP_DCSQT) in order to define a way in which the combined pixels of a combined picture piece are to be evaluated in associated areas.

14. The method according to claim 9, further comprising the step of defining said control instructions to additionally include an instruction defining processing of combined pixels of a combined picture piece.

15. The method according to claim 9, further comprising the step of defining said control instructions to additionally include an instruction defining a way in which combined pixels of a combined picture piece are to be evaluated in associated areas.

16. A machine readable storage, having stored thereon a computer program having a plurality of code sections executable by a machine for causing the machine to perform the steps of:

dividing a picture into a number of segments of equal size by means of vertical cuts;

combining pixel data of two respective adjacent segments, with a combined pixel being produced from corresponding pixels in the segments to be combined;

assigning a unique type to said combined pixels which corresponds to the distribution of the pixel values in the pair of corresponding pixels; and, defining a number of combined pixels in each line of said picture to be separately run-length coded, said defined number of combined pixels corresponding to the number of pixels through which the picture is moved per movement step in the horizontal direction.

17. A machine readable storage, having stored thereon a computer program having a plurality of code sections executable by a machine for causing the machine to perform the steps of:

defining a sub picture sequence having a data area for pixel values of said sub pictures of said sequence; and, defining an instruction area having control instructions for display of said sub-picture sequence, said control instructions including address pointers that determine where in said data area a run-length decoding is to start, wherein said address pointers of successive ones of said control instructions are chosen such that said run-length decoding starts at predetermined different addresses in the sub-picture to cause a predetermined motion and direction of the sub-picture formed within a display picture.

* * * * *

UNITED STATES PATENT AND TRADEMARK OFFICE
CERTIFICATE OF CORRECTION

PATENT NO.       : 6,993,249 B1
APPLICATION NO.  : 09/691806
DATED            : January 31, 2006
INVENTOR(S)      : Marco Winter and Harald Schiller It is certified that error appears in the above-identified patent and that said Letters Patent is hereby corrected as shown below:

On the Title page: Item [75] Inventors: name "Marco Wiinter" should be
--Marco Winter--.

Signed and Sealed this

Twenty-ninth Day of August, 2006

JON W. DUDAS
*Director of the United States Patent and Trademark Office*